United States Patent [19]

Sink

[11] Patent Number: 5,186,548
[45] Date of Patent: Feb. 16, 1993

[54] BEARING SHAFT SEAL

[75] Inventor: Danny R. Sink, Richmond, Va.

[73] Assignee: Brenco, Incorporated, Petersburg, Va.

[21] Appl. No.: 832,238

[22] Filed: Feb. 7, 1992

[51] Int. Cl.⁵ .......................... F16C 33/78; F16J 15/32
[52] U.S. Cl. ..................... 384/486; 277/153
[58] Field of Search ........... 384/477, 484, 486; 277/153

[56]  References Cited

U.S. PATENT DOCUMENTS

| 4,243,232 | 1/1981 | Repella | 277/153 |
| 4,278,261 | 7/1981 | Miura et al. | 277/153 |
| 4,336,945 | 6/1982 | Christiansen et al. | 277/153 |
| 4,432,557 | 2/1984 | Drucktenhengst | 277/153 |
| 4,550,920 | 11/1985 | Matsushima | 277/153 X |
| 4,721,312 | 1/1988 | Hornberger | 277/37 |
| 4,747,603 | 3/1988 | Sugino et al. | 277/26 |
| 4,799,808 | 1/1989 | Otto | 384/486 X |
| 4,848,776 | 7/1989 | Winkler | 384/436 X |
| 4,987,826 | 1/1991 | Deppert et al. | 92/168 |
| 5,037,213 | 8/1991 | Uchida et al. | 384/484 X |
| 5,083,802 | 1/1992 | Shimasaki et al. | 277/152 |

FOREIGN PATENT DOCUMENTS 867005  5/1961  United Kingdom ............... 384/486

Primary Examiner—Thomas R. Hannon
Attorney, Agent, or Firm—Kerkam, Stowell, Kondracki & Clarke

[57] ABSTRACT

A seal assembly for sealing an annular space between a housing having a cylindrical bore therein and a shaft member extending into and mounted for coaxial rotation relative to the bore, includes a resilient sealing body having an annular lubrication sealing lip and a dust seal including first inwardly directed resilient dust sealing lip having an inside diameter less than the diameter of the shaft member for contacting the shaft member and forming a primary dust seal therewith and a second inwardly extending annular dust seal lip between the first dust seal lip and the second dust seal lip having an inside diameter slightly greater than the diameter of said shaft member to form a non-contacting type seal with the other surface of the shaft member.

5 Claims, 1 Drawing Sheet

BEARING SHAFT SEAL

BACKGROUND OF THE INVENTION

2. Field of the Invention

This invention relates to bearing shaft seals and more particularly to such a seal including an elastomeric seal body having a lubricant sealing portion and an improved dust sealing portion spaced axially from the lubricant sealing portion.

2. Description of the Prior Art

It is well known to provide lubricant seals between a shaft and a cylindrical housing within which the shaft is supported for rotation relative to the housing, with the seal consisting of a rigid support ring adapted to fit in fluid-tight relation within a cylindrical bore in the housing. The ring supports a resilient rubber-like sealing element in fluid-tight contact with the outer surface of the relatively rotating shaft or a wear ring supported thereon. Examples of such seals are shown in U.S. Pat. Nos. 4,747,603 and 4,278,261. When seals of this type are operated in an environment where foreign matter such as dust, mud or water may contact the outer surface of the resilient sealing element, it is common practice to provide a secondary seal usually referred to as a dust lip or auxiliary lip, in an attempt to prevent the ingress of such foreign material (dust) into the sealed area between the housing and shaft. Seal assemblies including dust seals of this general type are shown, for example, in U.S. Pat. Nos. 4,243,232; 4,278,261; 4,336,945; and 4,721,312.

While the prior art bearing shaft seals incorporating dust lips have generally been satisfactory for most uses, they have not been entirely satisfactory for use in environments containing heavy concentrations of abrasive and corrosive dust, particularly where inspection of the seal and related equipment cannot readily be made during operation. For example, the wheels on railroad cars are supported on the car axles or shafts for rotation by low friction roller bearings, with seals provided at each end of each wheel bearing to prevent the escape of the grease or oil used to lubricate the bearing and to prevent ingress of contaminants. Such seals are subject to constant and severe vibration while the car is being transported and continuously operate in a hostile environment where dust and corrosive materials from the product hauled, as well as dust, mud and water from the roadbed, present a serious problem because of the tendency of abrasive and corrosive materials to find their way past the seal and contaminate the lubricant. Such contaminant materials tend to be very abrasive to the shaft and/or wear ring, causing premature wear and failure, with the consequent danger of accelerated dust penetration or lubrication loss and damage to the sealed bearing structure.

As pointed out in the above-mentioned U.S. Pat. No. 4,336,945, seals of this type generally employ a so-called hydrodynamic or pumping surface contour in the area of the primary lubricant sealing lip, which pumping surface tends to pump or impel escaping oil back into the sealed area. Any dust particles or the like which penetrate past the dust seal portion may actually be entrained in escaping oil adjacent the primary lubrication sealing area and be pumped back into the sealed bearing cavity. The abrasive action of even small amounts of such dust can increase the bearing friction, thereby causing overheating of the lubricant and ultimate failure of the bearing.

Attempts to solve the problem of dust penetration include providing dual dust lips spaced axially from one another, with the lips dimensioned to contact the shaft and to be deflected outwardly away from the lubricant seal portion when the seal is installed. It should be apparent, however, that where a seal is employed at each end of a bearing which is mounted from one end of an axle or shaft, the desired outwardly deflected arrangement of the dual dust seal lips disclosed in this patent cannot always be assured. Further, a double sealing lip continuously contacting the shaft increases the friction load which not only requires additional power or energy, but also results in additional heat which can result in an overheating of the seal and premature or accelerated degeneration of the elastomer. Heat from seals are a known contributing factor or cause of many hot boxes on rail cars. Even where the temperature of the bearing is not elevated to a dangerous condition, the temperature may rise sufficiently to cause a premature warning to be given from a hot box detector causing a railcar to be unnecessarily pulled from service.

In the normal operation of low friction roller bearings such as used to mount a wheel on a rail car axle, some small amount of lubricant will inevitably leak past the primary lubricant seal lip. Some leakage is desirable to wet the primary lip, and such leakage generally is minimized and controlled by a combination of features including the use of compression members such as an endless coil garter spring ring employed to continuously resiliently urge the lubricant sealing lip into contact with the rotating shaft and the use of the above-mentioned hydrodynamic surface contour on the resilient primary lubricant sealing lip.

Any lubricant weepage past the dust lip will quickly become contaminated with dust particles and will tend to build up on the shaft outwardly adjacent the dust lip. Entrainment of substantial dust particles causes the contaminated lubricant to become abrasive and wear the shaft or wear ring and, to a much lesser extent, the resilient sealing element with which it is in rubbing contact. Such seal and/or shaft ring wear reduces the efficiency of the dust shield and increases the likelihood of ingress of contamination through the primary lubricant seal into the sealed bearing area. Also, ingress of dust particles will ultimately increase wear on the primary lubricant sealing surface and clog the hydrodynamic feature referred to above.

It is, therefore, a primary object of the present invention to provide an improved bearing shaft seal assembly.

Another object is to provide a shaft seal element which includes improved dust sealing features.

Another object is to provide such a sealing element including a primary lubricant sealing area and axially spaced dust sealing area, with the dust sealing area including both a shaft contacting and a non-contacting lip to improve the dust sealing qualities of the assembly.

Another object of the invention is to provide an improved wheel bearing seal assembly for heavy duty vehicles having improved sealing qualities and longer service life.

SUMMARY OF THE INVENTION

In the attainment of the foregoing and other objects, an important feature of the invention resides in providing a low friction seal employing a double dust lip seal which is highly effective in preventing the ingress of dust particles into the sealed area. This is accomplished by providing a primary and a secondary dust sealing lip, i.e, a double dust lip, with the primary dust sealing lip and secondary dust sealing lip being located axially outward from the primary or main lubricant sealing lip and with the primary dust sealing lip dimensioned to be in continuous rubbing or sealing contact with the outer surface of the relatively rotating shaft element and the inner or secondary dust sealing lip located axially inward of the primary dust sealing lip and dimensioned to be in closely spaced relation to but not in rubbing contact with the shaft element.

The primary and secondary dust sealing lips are dimensioned such that the outer primary dust lip is relatively flexible while the inner or secondary dust lip provides greater rigidity or stability to thereby maintain the close tolerance spacing with the shaft. The secondary dust sealing lip operating out of contact with the shaft element has been found to substantially reduce the ingress of dust particles into the area outward of and adjacent to the primary lubricant sealing surface of the seal body. As a consequence, the ingress or pumping of contaminated oil into the sealed area of the bearing by the hydrodynamic surface on the seal is substantially reduced. It is believed that dust particles which find their way past the primary dust seal lip tend to become entrained in lubricant used to pack or pre-lube the seal or which has weeped from the sealed area and which has found its way to the area between the primary and secondary dust sealing lips. Thus, the more heavily contaminated lubricants in the cavity area are concentrated between the primary and secondary dust sealing lips. Further, the non-contacting secondary dust sealing lip has less tendency to wear and therefore maintains its enhanced dust sealing effect over a greater period of time.

BRIEF DESCRIPTION OF THE DRAWING

Other features and advantages of the invention will be apparent from the detailed description contained hereinbelow, taken in conjunction with the drawings, in which.

DESCRIPTION OF THE PREFERRED EMBODIMENT

Figure 1:
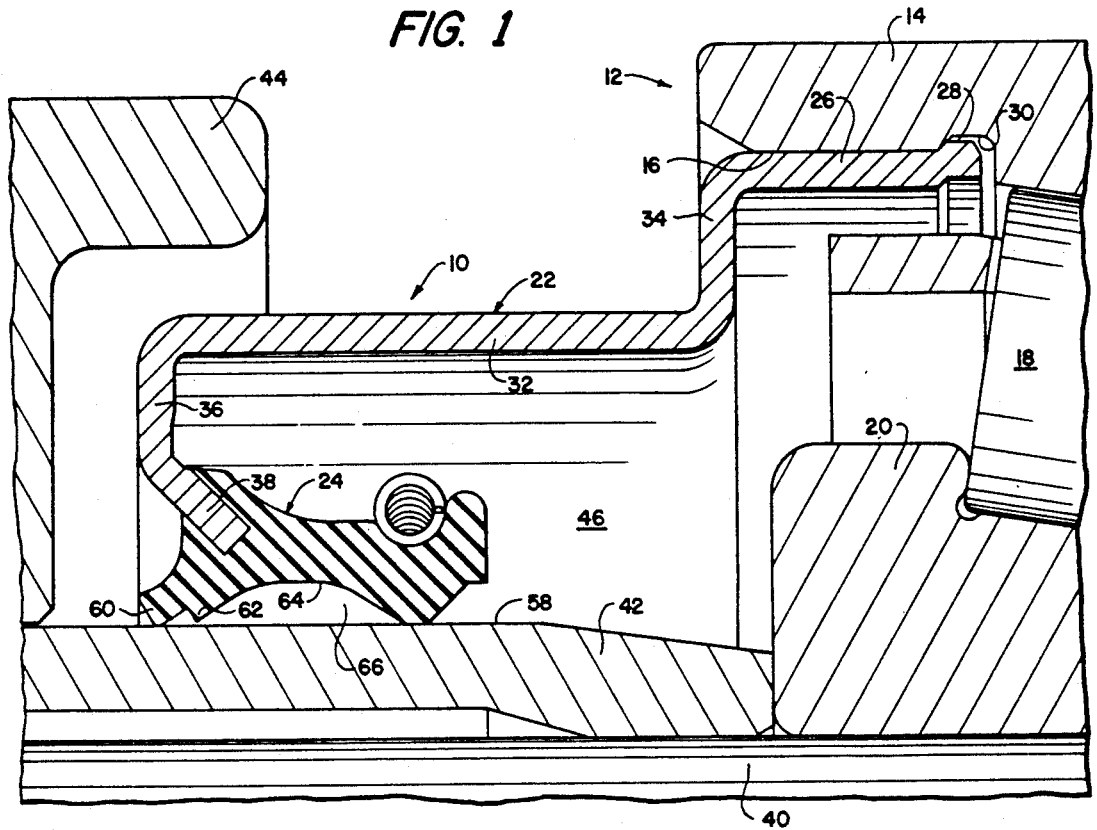
FIG. 1 is an enlarged fragmentary sectional view of a portion of a rail car wheel bearing and shaft embodying the improved seal of the present invention.

Referring now to the drawings in detail, an improved seal assembly in accordance with the present invention is designated generally in FIG. 1 by the reference numeral 10 and it is shown installed for use in connection with a low friction rail car wheel bearing assembly indicated generally by the reference numeral 12. The bearing assembly includes an outer housing or cup member 14 having a cylindrical recess 16 formed in its open end for receiving the seal assembly 10, and races for the bearing elements 18 which, in turn, rotate on the bearing surface of inner race ring members 20.

The seal assembly 10 comprises a rigid support ring 22 having mounted on its inner periphery a resilient sealing element indicated generally at 24. Support ring 22 includes a large diameter open ended section 26 adapted to fit in sealing relation within the cylindrical bore 16 to rigidly but releasably retain the seal on the bearing An enlarged retaining lip 28 formed on the end of cylindrical portion 26 is adapted to snap into an undercut groove 30 in the cylindrical bore 16 to retain the seal assembly on the bearing A smaller diameter cylindrical body portion 32 of the support ring 22 extends outwardly from the bearing 12 and is joined to portion 26 by a radial segment 34. Ring 22 terminates at its end spaced from the bearing assembly 12 in an inwardly directed flange portion 36 having an inturned lip 38 for supporting the resilient seal element 24. Seal element 24 is molded on and is permanently bonded to the rigid metallic ring 22 in a manner well known in the art.

In the embodiment illustrated in the drawings, the bearing and seal assembly is supported on the cylindrical shaft or axle 40 of the rail car, and a wear ring or spacer element 42 engaging the end of the inner race element 20 axially fixes the bearing and seal on the shaft 40. Wear ring 42 preferably is formed from a harder, more wear resistant material than shaft 40, and may be replaced when worn or damaged, as necessary. A retaining cap 44 is rigidly mounted on the end of the shaft by bolt means, not shown, with the cap 44 engaging the end of the wear ring 42 to firmly clamp the wear ring and the bearing inner race on the shaft. Thus, the wear ring 42 becomes, in effect, an integral part of the shaft with inner surface of the wear ring and shaft being in fluid-tight sealing relation. As seen in FIG. 1, the sealing element 24 contacts the outer cylindrical surface 58 of the wear ring 42 to provide the desired seal to maintain the lubricant within the bearing and the sealed spaced indicated generally at 46. It should be apparent, however, that the wear ring may be omitted and the seal formed directly between the sealing element 24 and the outer surface of the shaft 40.

Figure 2:
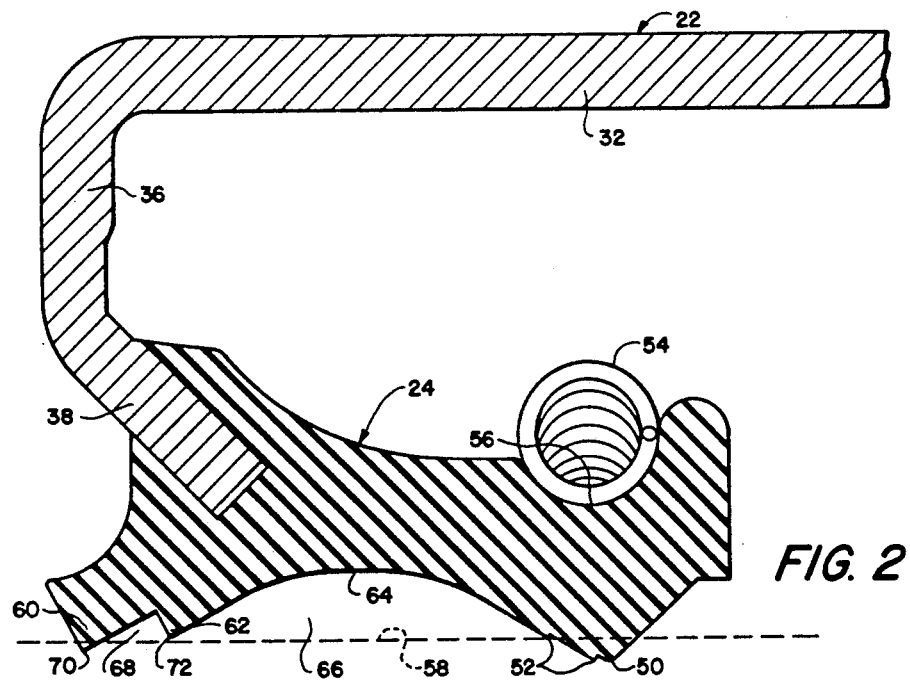
FIG. 2 is a further enlarged view of a portion of the seal structure shown in FIG. 1.

The seal element 24 is preferably integrally molded from a single mass of homogeneous rubber-like material preferably having a durometer hardness within the range of about 73 to 80 and for most applications should not have a hardness exceeding a 90 durometer reading. The seal body 24 is a continuous annular ring having an inner primary lubricant sealing area at its free end, i.e., the end spaced from the support lip 38. As shown in FIG. 2, the primary lubrication sealing area is defined by a lubricant sealing lip 50. A contoured hydrodynamic surface is formed on the outwardly directed surface of the lip 50 with this hydrodynamic or pumping surface being indicated by the surface contours 52. As indicated previously, such hydrodynamic pumping surfaces are known in the art and as such forms no part of the present invention. Preferably, a resilient compression element such as the endless coil spring or garter spring 54 is supported on an outwardly directed groove radially outward from the lip 50 to maintain a continuous, controlled sealing pressure between the sealing lip 50 and the outer sealing surface 58 of the wear ring 42.

At its opposite or outer end, the elastomeric body is provided with a dust seal in the form of a double dust lip including a primary outwardly directed dust lip 60 and an axially inwardly spaced, outwardly directed secondary dust lip 62 at locations generally radially inward from the end flange portion 36 of the metallic support ring. The seal body 24 has a concave inner surface 64 between sealing lips lips 60 and 62 which, together with the outer surface 58 of the wear ring 42, defines an annular cavity or pre-lube chamber 66 when the seal is installed. A second annular chamber or cavity 68 is provided between the adjacent surfaces of dust seal lips 60 and 62 and the wear ring surface 58. In practice, the chambers 66 and 68 will be filled or packed with a lubricant prior to installing the seal on the shaft or wear ring, whereby the seal is prelubricated. The lubricant used to pack the seal may be different than but must be compatible with the lubricant used in the sealed bearing.

The axial spacing between the primary lubrication sealing lip 50 and the secondary dust seal lip 72 is substantially greater than the distance between the first and second dust seal lips 70 and 72, respectively, and similarly the size of the cavity 66 is substantially larger than the volume of cavity 68 The ratio of the distance between lips 50 and lip 62 to the distance between lips 60 and 62 should be at least 4 to 1 and preferably at least 6 to 1.

As indicated by the broken line in FIG. 2, the diameter of the outer surface 58 of wear ring 42 will, when the seal is installed, deflect or deform the inner sealing edge 70 of lip 60 outward to maintain continuous rubbing contact; however, the corresponding inner edge 72 of the secondary dust seal lip 62 will be spaced from the surface 58 In practice, it is desired that the difference between the diameter of the secondary dust seal lip and the diameter of the shaft member be maintained as low as practical to produce an effective seal therebetween without resulting in actual rubbing contact. It has been found that this difference should be within the range of about 0.001 to 0.008 inches, and preferably about 0.002 to 005 inches. In contrast, the primary dust seal should be deflected outward by the shaft member to increase its diameter by about 0.003 to 0.018 inches, and preferably about 0.008 to 0.013 inches.

Tests have been conducted to compare the efficiency of the seal according to the present invention with a similar seal design but without the secondary dust seal lip. These tests have shown that contamination of the lubricant in the sealed area, i.e., inward of the primary lubricant seal, may be reduced by as much as 60% by use of the secondary, non-contacting dust seal lip. At the same time, the non-contact sealing feature of the secondary dust seal lip does not increase the torque load of the seal.

It is not known precisely how the non-contacting secondary dust seal lip functions to reduce the contamination of the bearing lubricant. It is believed however, that dust particles which find their way past the primary dust seal lip into the annular chamber 68 initially become entrained in the lubricant which acts somewhat like a stuffing box to isolate and retain the contaminated lubricant primarily in chamber 68 so that less contamination or dust reaches the area of the primary lubricant seal where it can be pumped back into the bearing by the hydrodynamic seal surface described hereinabove. Regardless of the precise manner in which the seal functions, the unique design is extremely effective in preventing the ingress of dust into the sealed area of the bearing, and this is accomplished without increased friction.

It is known that friction from commercially available lubricant seals employed on rail cars provide substantial rolling resistance. This is particularly true when initially starting a car from the rest position where up to one horsepower may be required to overcome the initial friction of each of the 16 seals employed to seal the 8 wheel bearings of a rail car. Thus, at least in theory, the train locomotive would have to apply 1600 horsepower just to overcome the rolling resistance of the wheel bearing seals to start a 100 car train. Once the train is in motion, a lesser but significant amount of power is still required to continuously overcome the bearing seal friction. Thus, elimination of a continuous rubbing seal surface in accordance with the present invention may result in substantial energy savings over seals employing two dust seal lips in continuous rubbing contact with the shaft.

While a preferred embodiment of the invention has been disclosed and described, it should be understood that the invention is not so limited but that it is intended to include all embodiments which would be apparent to one skilled in the art and which come within the spirit and scope of the invention.

What is claimed is:

1. A rail car wheel bearing seal assembly for sealing an annular space between a wheel housing having a cylindrical bore therein and an axle member extending into the base and having a bearing mounted thereon supporting the wheel for rotation thereon, the sealing assembly including a rigid support ring having a generally cylindrical body portion adapted to be received and supported in the cylindrical bore in fluid-tight relation therewith, and a resilient ring-shaped sealing body mounted on said support ring in position to contact and form a fluid seal around the outer surface of the axle member, said resilient sealing body including an annular lubrication sealing lip adapted to contact the axle around its periphery and low friction dust seal means axially spaced from said lubrication sealing lip, said dust seal means comprising a single annular, resilient primary dust seal lip having an inside diameter less than the diameter of said shaft member for contacting the shaft member and forming a primary dust seal therewith, a single annular, annular secondary dust seal lip between said primary dust seal lip and said lubrication sealing lip, said secondary dust seal lip having an inside diameter slightly greater than the diameter of said shaft member whereby when the seal assembly is mounted on said housing said secondary dust seal lip will form a non-contacting seal with the outer surface thereof, a first annular recess in said resilient body between said primary and said secondary dust seal lips, said first annular recess in combination with the shaft member providing a first annular cavity spaced axially from said lubrication sealing lip, the ratio of the axial distance between said lubrication sealing lip and said secondary dust seal lip to the distance between said secondary dust seal lip and said primary dust seal lip being at least 4 to 4, said resilient sealing body having an annular concave inner surface between said secondary dust seal lip and said lubrication sealing lip, said concave surface cooperating with the outer surface of the shaft member to define a second annular cavity extending between said secondary dust seal lip and said lubrication sealing lip, said resilient sealing body being molded from a single homogeneous mass of elastomeric material having a durometer hardness within the range of 73 to 90, the difference between the diameter of said secondary dust seal lip and the diameter of the shaft member being within the range of about 0.001 to about 0.008 inches.

2. The seal assembly defined in claim 1 wherein said resilient sealing body is molded from a single homogeneous mass of elastomeric material having a durometer hardness within the range of 73 to 80.

3. The seal assembly defined in claim 1 wherein the difference between the diameter of said second dust seal lip and the diameter of said shaft member is within the range of about 0.002 to about 0.005 inches.

4. The seal assembly defined in claim 1 wherein said second annular cavity has a volume substantially greater than said first annular cavity.

5. The seal assembly as set forth in claim 1 wherein said first and said second dust seal lips are outwardly directed with respect to said annular cavity.

* * * * *